July 12, 1966
A. C. GREEN
3,260,899
REMOTE TEMPERATURE CONTROL SYSTEM
Filed April 10, 1964
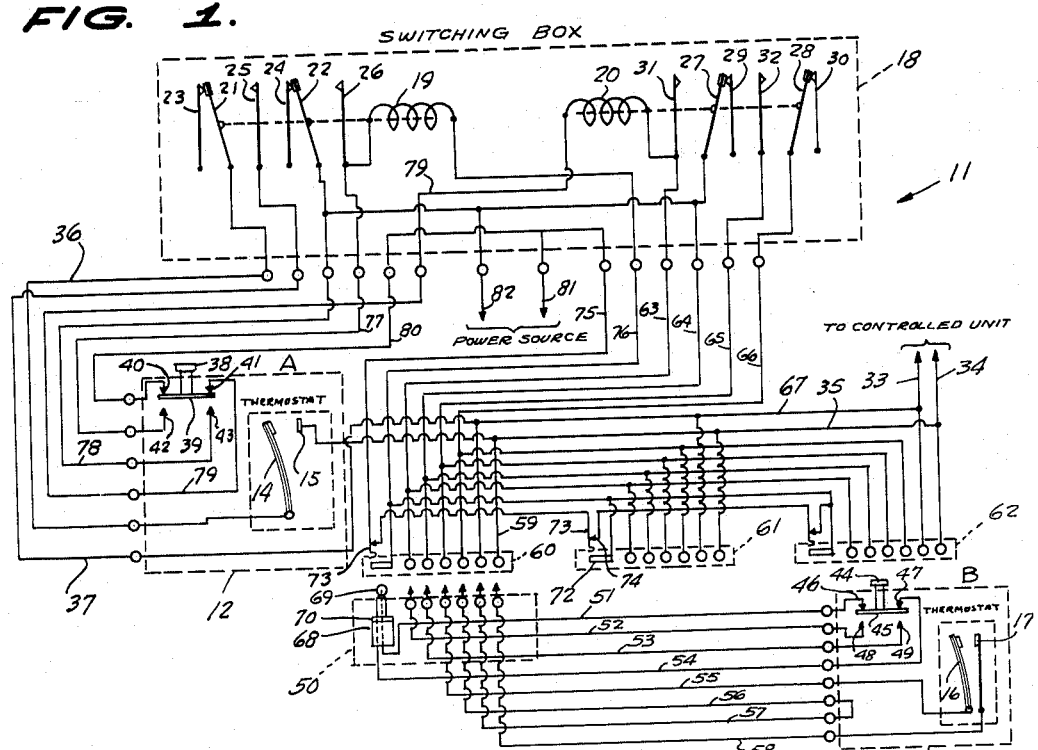
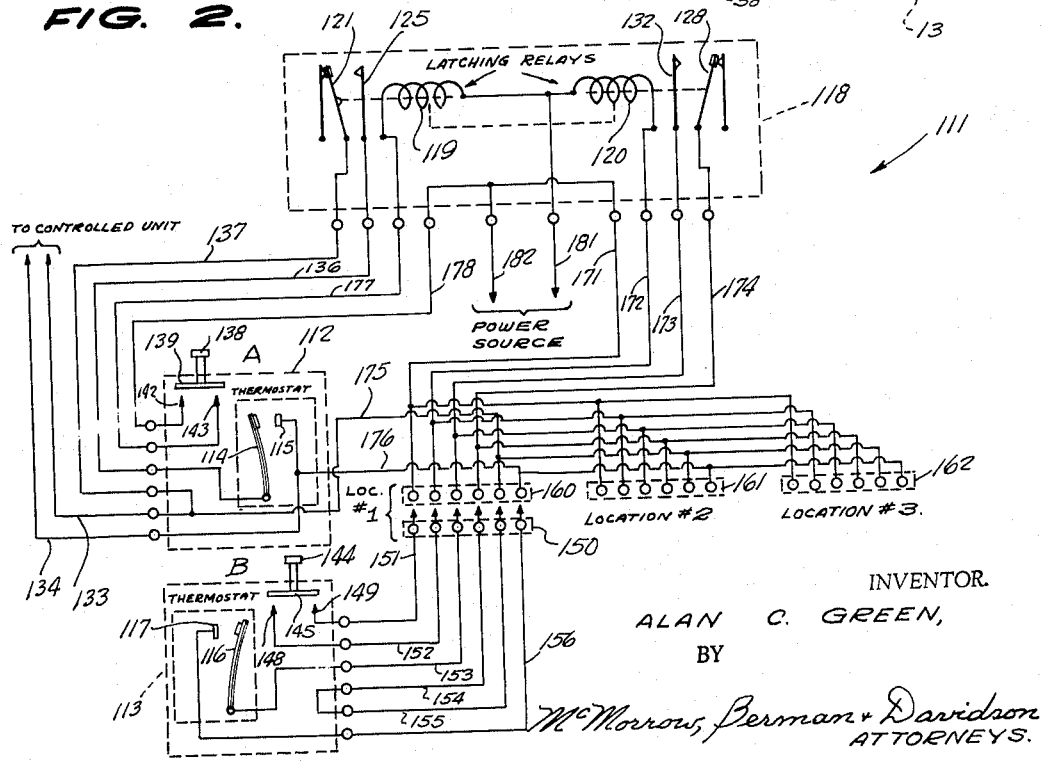
INVENTOR.
ALAN C. GREEN,
BY
McMorrow, Berman & Davidson
ATTORNEYS.

United States Patent Office 3,260,899
Patented July 12, 1966

3,260,899
REMOTE TEMPERATURE CONTROL SYSTEM
Alan C. Green, 1480 Pleasant Valley Way,
West Orange, N.J.
Filed Apr. 10, 1964, Ser. No. 358,842
8 Claims. (Cl. 317—137)

This invention relates to automatic control circuits for heating or cooling systems, and more particularly to a temperature control system of the multiple-zone type wherein a heating or cooling system may be controlled selectively in accordance with the temperature at different spaced locations.

A main object of the invention is to provide a novel and improved multiple-zone temperature control system enabling the associated cooling or heating plant to be independently controlled from different locations so as to respond to temperature conditions at said different locations, the system being relatively simple in construction, being easy to install, and being reliable in operation.

A further object of the invention is to provide an improved temperature control system for controlling the operation of a cooling or heating plant from a plurality of different locations and in accordance with the temperatures at said locations, the system involving relatively inexpensive components, having a high degree of flexibility in use, and enabling the heating or cooling plant to be selectively controlled from any desired portion of the area which it is intended to service.

A still further object of the invention is to provide an improved automatic thermostatic heat control system for use with a heating or cooling plant and which employs a plurality of control units located at different points of the system and provided with independent switching means for controlling the system, the arrangement being such that all the other control units are rendered inoperative when a designated selected control system is operated, so that the system can be operated without interference among the various control units and so that only the temperature from the selected location is the factor regulating the operation of the associated heating or cooling system.

A still further object of the invention is to provide an improved control circuit for use with a heating or cooling plant and adapted to be installed in a residence or other location wherein it may be desirable to control the heating or cooling plant in accordance with the temperature prevailing at a designated part of the residence or other establishment in which the system is installed, the system being provided with thermostatically controlled switching units located at different parts of the establishment, said units being arranged so that they may be independently and exclusively placed in control of the heating or cooling plant and being arranged to automatically render the other control units of the system inoperative, thereby enabling the heating or cooling system to be controlled in accordance with the temperature conditions at any location in the establishment provided with a local control unit.

Further objects and advantages of the invention will become apparent from the following description and claims, and from the accompanying drawings, wherein:

FIGURE 1 is a schematic wiring diagram showing the electrical circuit connections of one form of typical automatic thermostatic control system constructed in accordance with the present invention.

FIGURE 2 is a schematic wiring diagram showing the electrical connections of another typical automatic thermostatically controlled system in accordance with the present invention.

Referring to the drawings, and more particularly to FIGURE 1, 11 generally designates a zoned temperature control system constructed in accordance with the present invention for selectively controlling the operation of a device to be thermostatically controlled, for example, a heating system, in accordance with temperature changes at various different locations, to be selected by the user of the system. Thus, the system 11 includes a first thermostat switch 12 at one location, for example, in the living room of a residence, and a second thermostat switch unit 13 adapted to be connected into the system at any one of a plurality of other locations, in a manner presently to be described. The first thermostat switch unit 12 is of conventional construction and, for example, may comprise a bi-metal temperature-sensitive arm 14 which is engageable with a fixed contact 15 at a predetermined temperature which can be preset in a conventional manner. The second thermostat unit 13 may similarly include a switch arm 16 of bi-metal construction which is engageable with a fixed contact 17 at a predetermined temperature, established by setting the gap between 16 and 17 in a conventional manner.

Obviously, conventional temperature-sensitive switches other than those of the bi-metal arm type may be employed, if so desired.

The system 11 further includes a switching box 18 which may be installed in any convenient location and which includes a first relay 19 and a second relay 20. The relays 19 and 20 are of the double-pole, double-throw type. Relay 19 is provided with the respective pivoted armatures 21 and 22 normally engaging unconnected fixed contacts 23 and 24 and movable into engagement with opposite fixed contacts 25 and 26, responsive to the energization of the relay. The second relay 20 is provided with the respective pivoted armatures 27 and 28 normally engaging unconnected fixed contacts 29 and 30 and movable into engagement with opposite fixed contacts 31 and 32 responsive to energization of said second relay 20.

The system 11 is connected to a pair of control conductors 33 and 34 adapted to be connected to the device to be controlled, for example, in series with said device and a suitable source of current. The stationary thermostat switch contact 15 is connected by a wire 35 to one of the control wires 34. The bi-metal switch arm 14 is connected by a wire 36 to the relay pole 21. The fixed contact 25, engageable by said pole 21 responsive to the energization of relay 19, is connected by a wire 37 to the remaining control wire 33. Thus, when relay 19 is energized, pole 21 engages the fixed contact 25 and connects the thermostatic switch unit 12 to the control wires 33 and 34 by a circuit comprising wire 34, wire 35, contact 15, bi-metal arm 14, wire 36, pole 21, relay contact 25, wire 37 and control wire 33.

The thermostat switch unit 12 also includes a push button switch 38 having a pole 39 which normally bridges a pair of upper contacts 40 and 41 and which may be actuated to disengage from said contacts and to bridge a pair of lower contacts 42 and 43. The remote control unit 13 similarly is provided with a push button switch 44 having a pole 45 normally engaging a pair of upper contacts 46 and 47 and which may be actuated to disengage from said contacts 46 and 47 and to bridgingly engage a pair of lower contacts 48 and 49. The remote conrol unit 13 is provided with a connection plug 50 connected by a cable consisting of the respective wires 51 to 58 connected to the various terminals of the elements of the unit 13 and leading to male contact prongs provided on the plug unit 50. Thus, the wire 58 is connected to a contact prong which is engageable in a sleeve connector connected to a wire 59 in a jack unit 60 at one remote location in the system. The system may include any desired number of additional jack assemblies at spaced remote locations, for example, may include two additional jack assemblies 61 and 62 at two other locations remote from each other and from the first thermostat switch unit 12.

The wires 52, 53, 55, 56 and 57 of the connection cable similarly lead to male prongs in the plug unit 50 which are engageable in sleeve contacts provided in the jack unit 60, 61 or 62, to connect these wires to respective wires 63, 64, 65, 66 and 67. The unit 50 further includes a telephone plug unit 68, the wire 51 being connected to the center terminal 69 of the telephone plug and the wire 54 being connected to the sleeve terminal 70 of the telephone plug. Each of the jack assemblies 60, 61 and 62 is provided with a telephone jack assembly adapted to receive the telephone plug member 70 when the multiple prong plug unit 50 is engaged in the jack assembly. Each telephone jack receiving assembly comprises a ring contact element 72, a tongue contact element 73 and a fixed shorting contact element 74 normally engaged by the contact element 73 but disengaged therefrom when the telephone plug shank enters the jack and when its terminal 69 makes contact with the tongue member 73. The normally closed contacts 73, 74 are connected in series between a wire 75 and a wire 76. The respective female sleeve contact rings 72 are connected to the wire 76. The reason for the shorting contacts 74, 73 is to maintain continuity so that the local control unit 12 can be activated even though the remote control unit 13 is completely disconnected from the system.

One terminal of the winding of relay 19 is connected to the wire 76. The opposite terminal of the winding of relay 19 is connected to relay switch arm 26, which is in turn connected by a wire 77 to the switch contact 42. The other switch contact 43 is connected by a wire 78 to relay arm 22. One terminal of the winding of relay 20 is connected by a wire 79 to the upper switch contact 41, and the remaining upper switch contact 40 is connected by a wire 80 to one power supply wire 81. The other power supply wire 82 is connected to the relay arms 22 and 27.

In the condition shown in the drawings, neither of the thermostat units 12 and 13 is in a condition connecting the thermostatic switches to the control conductors 33 and 34.

It will be understood that the respective terminals of the remotely spaced jack assemblies 60, 61 and 62 are each connected in a similar manner to the respective wires 35, 67, 66, 65, 64, 63, 76 and 75, with the normally closed internal jack switching assemblies 73, 74 connected in series as illustrated between the wires 76 and 75.

Assuming the unit 50 to be plugged into one of the jack units 60, 61 or 62, for example, the jack unit 60, the system is ready for selective control by either the thermostat assembly 12 or the thermostat assembly 13. Assuming that it is desired to provide thermostatic control at the location of the thermostat unit 12, the push button switch 38 is actuated, causing pole 39 to bridge the contacts 42 and 43. This energizes the relay 19 by a circuit comprising line wire 82, wire 78, contact 43, pole 39, contact 42, wire 77, the winding of relay 19, wire 76, plug sleeve terminal 70, wire 54, the contacts 47, 45 and 46 of switch 44, wire 51, plug terminal 69, the tongue contact 73 of the associated plug jack in unit 60, wire 75 and line wire 81. The energization of relay 19 establishes a holding circuit including the contacts 22, 26 connected respectively through wires 77, 78, and therefore bridging the contacts 42, 43, allowing the relay 19 to remain energized when the push button element of switch 38 is released. This holding circuit will remain effective until the push button switch 44 of the remote thermostat unit 13 is actuated, opening the holding circuit at contacts 45, 46 and 47.

The energization of relay 19 causes pole 21 to engage contact 25. This connects the thermostatic switch portion of the assembly 12 to the control wires 33 and 34 through a circuit comprising wire 35, stationary contact 15, bi-metal contact 14, wire 36, pole 21, relay contact 25, wire 37 and wire 67. Therefore, the thermostatic unit 12 is placed in control of the heating system, or other system to be thermostatically controlled, and remains in control until the remote push button switch 44 is actuated. When this is done, the holding circuit for the relay 19 is interrupted, causing the relay to release, thereby disconnecting the thermostatic switch assemblies 14, 15 from the control wires 33, 34 and at the same time connecting the thermostatic switch elements 16, 17 to the control wires 33 and 34 in place thereof. Thus, operation of switch 44 energizes relay 20 by a circuit comprising line wire 81, the contacts 40, 39, 41 of switch 38 in a release position, wire 79, the winding of relay 20, wire 63, wire 52, contacts 48, 45 and 49 of switch 44, wire 53, wire 64 and line wire 82. This establishes a holding circuit for the relay 20, including the contacts 27, 31, which maintains the relay 20 energized until the first push button switch 38 is again actuated. The energization of relay 20 causes pole 28 to engage stationary contact 32 and to connect the thermostatic switch elements 16, 17 to the control conductors 33 and 34 through a circuit comprising wire 67, wire 57, wire 56, wire 66, pole 28, fixed contact 32, wire 65, wire 55, bi-metal arm 16, stationary contact 17, wire 58, wire 59 and wire 35. The heating system, or other device to be thermostatically controlled, is now under the control of the remote thermostatic control unit 13. This control continues until the first push button switch 38 is again actuated, whereby control is then transferred to the thermostatic switch of the assembly 12.

Referring now to the embodiment illustrated in FIGURE 2, the control system is designated generally at 111 and the control wires leading to the controlled unit (for example connected in series between the controlled unit and a suitable current source) are designated at 133 and 134. The remote thermostatic unit is designated at 113 and is provided with the multiple prong plug 150 engageable with spaced remote female receptacles 160, 161 or 162. The unit 113 has a cable containing the wires 151 to 156, leading to the prongs of the plug 150, and the respective female terminals of the plugs 160, 161 and 162 are connected to wires 171 to 176 which are respectively connected to the wires 151 to 156 when the plug 150 is inserted in any one of the female receptacles 160, 161 or 162. The local thermostat assembly is designated at 112 and is provided with a push button switch 138 having a pole 139 adapted to bridgingly engage a pair of contacts 142 and 143. The thermostat switch unit comprises the bi-metal contact arm 114 which is engageable with a stationary contact 115 which is adjustable in a conventional manner so as to provide closure of the thermostatic contacts at a predetermined desired temperature. The remote thermostat switch assembly 113 is likewise provided with a push button switch 144 having a pole 145 and contacts 148 and 149 adapted to be bridged by the pole 145 when switch 144 is operated. The remote unit 113 has the thermostatic contacts comprising the bi-metal arm 116 and the adjustable stationary contacts 117. The system 111 includes a switching box 118 which contains a conventional double-coil latching relay assembly having the respective relay winding elements 119 and 120 and provided with conventional latching means to hold the contacts associated with one relay element closed subsequent to energization of the relay winding element until the opposite relay winding element is energized. The latching relay assembly 118 therefore takes the place of the respective relays 19 and 20 and their holding circuits, as described in the preceding form of the invention.

It will be seen that one terminal of each relay winding 119 and 120 is connected to one line wire 181. The remaining terminal of relay coil 119 is connected by a wire 177 to switch contact 143. Switch contact 142 is connected by a wire 178 to line wire 182. Thus relay winding 119 is energized responsive to operation of switch 138, which automatically unlatches the contacts associated with the other relay winding 120. Energization of the winding 119 closes its contacts 121, 125, the fixed contacts 125 being connected by a wire 136 to bi-metal arm 114. The pole 121 is connected by a wire 137 to the wire 175. The closure of contacts 121, 125 connects the thermostatic switch members 114, 115 to the control wires 134, 133, through a circuit comprising wire 134, contact 115, bi-metal arm 114, wire 136, relay contact 125, pole 121, wire 137 and control wire 133. This places the local thermostatic unit 12 in control of the device to be supervised, such as a heating apparatus or other apparatus to be thermostatically controlled. When the control of the apparatus by the remote unit 113 is desired, the push button switch 144 is operated, which energizes the relay winding 120 through a circuit comprising line wire 181, the winding 120, wire 172, wire 152, contact 148, pole 145, contact 149, wire 151, wire 171, and line wire 182. As above mentioned, when relay winding 120 becomes energized, the contacts 121, 125 of the previously energized relay winding 119 are released by the release of the associated latching mechanism, and the contacts associated with the winding 120, shown at 128 and 132 are closed and are latched. This places the thermostatic switch members 116, 117 of the remote unit 113 in circuit with the control wires 133, 134 by a circuit comprising wire 133, wire 175, wire 155, wire 154, wire 174, pole 128, contact 132, wire 173, wire 153, bi-metal arm 116, contact 117, wire 156, wire 176, and control wire 134. To restore control to the local thermostatic unit 112 it is merely necessary to operate the push button switch 138 of said local thermostatic unit.

From the above description, it will be seen that in either of the forms of the invention described, control of the system can be assumed at any thermostatic switch location by actuating the push button switch of the thermostatic control unit at said location. Thus, the local thermostat switch unit 12 or 112 may be permanently situated in the living room of a residence and the remote unit 13 or 113 may be located in a bedroom or in some other location in the residence. If it is desired to control the heating system (or cooling system) of the residence in accordance with the temperature at the remote location, it is merely necessary to operate the push button switch 44 or 144 of the remote thermostatic unit. Thereafter, if it is desired to restore control to the local thermostatic unit, it is merely necessary to operate the push button switch 38 or 138 at the local thermostatic control unit 12 or 112.

While certain specific embodiments of an improved zoned temperature control system have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a zoned temperature control system, a pair of control conductors adapted to be connected to a device to be thermostatically controlled, a first thermostat switch, a second thermostat switch at a different location, a first relay having contacts closing responsive to energization of the relay, latching means to hold said contacts closed subsequent to such energization, means to connect said first thermostat switch to said control conductors responsive to closure of said relay contacts, a second relay having contacts closing responsive to the energization of said second relay, means to connect said second thermostat switch to said control conductors responsive to closure of said second-named relay contacts, latching means to hold said second-named relay contacts closed subsequent to energization of said second relay, a source of current, a two-position control switch associated with each relay, each control switch having a normal position and an operated position, circuit means connecting each relay to the source responsive to the actuation of the associated control switch to its operated position, and means releasing the latching means of each relay responsive to the energization of the other relay.

2. In a zoned temperature control system, a pair of control conductors adapted to be connected to a device to be thermostatically controlled, a first thermostat switch, a second thermostat switch at a different location, a first relay having contacts closing responsive to energization of the relay, means to hold said contacts closed subsequent to such energization, means to connect said first thermostat switch to said control conductors responsive to closure of said relay contacts, a second relay having contacts closing responsive to the energization of said second relay, means to connect said second thermostat switch to said control conductors responsive to closure of said second-named relay contacts, means to hold said second-named relay contacts closed subsequent to energization of said second relay, means to open one set of said relay contacts when the other set of relay contacts is closed, a source of current, respective control switches located physically adjacent the thermostat switches, and means connecting each relay to said source of current through a respective control switch, whereby the relays may be selectively energized.

3. In a zoned temperature control system, a pair of control conductors adapted to be connected to a device to be thermostatically controlled, a first temperature-responsive switch, a second temperature-responsive switch at a different location, first relay means associated with the first temperature-responsive switch, means to connect said first temperature-responsive switch to said control conductors responsive to the energization of said first relay means, second relay means associated with the second temperature-responsive switch, means to connect said second temperature-responsive switch to said control conductors responsive to the energization of said second relay means, a source of current, a two-position control switch associated with each relay means, each control switch having a normal position and an operated position, circuit means connecting each relay means to the source responsive to the actuation of its associated control switch to its operated position, respective latching means maintaining the connections of the temperature-responsive switches to the control conductors, and means releasing the latching means associated with each temperature-responsive switch responsive to the energization of the relay means associated with the other temperature-responsive switch whereby only one of said temperature-responsive switches can be connected to said control conductors at any time.

4. In a zoned temperature control system, a pair of control conductors adapted to be connected to a device to be thermostatically controlled, a first temperature-responsive switch, a second temperature responsive switch at a different location, first relay means, means to connect said first temperature-responsive switch to said control conductors responsive to the energization of said first relay means, a source of current, a first holding circuit, circuit means connecting said first relay means to said source through said holding circuit, means closing said first holding circuit responsive to energization of said first relay means, second relay means, circuit means connecting said second temperature-responsive switch to said control conductors responsive to the energization of said second relay means, a second holding circuit, circuit means connecting said second relay means to said source through said second holding circuit, means closing said second holding circuit responsive to energization of said second relay means, means to selectively energize said first and second relay means, and means to open the holding circuit of each relay means responsive to the energization of the other relay means, whereby only one of said temperature-responsive switches can be connected to said control conductors at any time.

5. In a zoned temperature control system, a pair of control conductors adapted to be connected to a device to be thermostatically controlled, a first thermostat switch, a second thermostat switch at a different location, a first relay, means to connect said first thermostat switch to said control conductors responsive to the energization of said first relay, said first relay having a pair of holding contacts, a source of current, a holding circuit connecting said first relay to said source through said holding contacts, means closing said holding contacts responsive to the energization of the first relay, a second relay, means to connect said second thermostat switch to said control conductors responsive to the energization of said second relay, said second relay having a pair of holding contacts, a holding circuit connecting said second relay to said source through said last-named holding contacts, means closing said last-named holding contacts responsive to the energization of said second relay, respective energizing circuit means including control switches connected to said relays to selectively energize said relays, and means to open the holding circuit of each relay responsive to the operation of the control switch associated with the other relay, whereby only one of the thermostat switches can be connected to the control conductors at any time.

6. In a zoned temperature control system, a pair of control conductors adapted to be connected to a device to be thermostatically controlled, a first thermostat switch, a second thermostat switch at a different location, a first relay, means to connect said first thermostat switch to said control conductors responsive to the energization of said first relay, said first relay having a pair of holding contacts, a source of current, a holding circuit connecting said first relay to said source through said holding contacts, means closing said holding contacts responsive to the energization of the first relay, a second relay, means to connect said second thermostat switch to said control conductors responsive to the energization of said second relay, said second relay having a pair of holding contacts, a holding circuit connecting said second relay to said source through said last-named holding contacts, means closing said last-named holding contacts responsive to the energization of said second relay, respective control switches located physically adjacent the thermostat switches, means connecting each relay to said source of current through a respective control switch, whereby the relays may be selectively energized, and means to open the holding circuit of each relay responsive to the operation of the control switch associated with the other relay, whereby only one of the thermostat switches can be connected to the control conductors at any time.

7. In a zoned temperature control system, a pair of control conductors adapted to the connected to a device to be thermostatically controlled, a first thermostat switch, a second thermostat switch, a first relay having contacts closing responsive to energization of the relay, latching means to hold said contacts closed subsequent to such energization, circuit means to connect said first thermostat switch to said control conductors responsive to closure to said relay contacts, a second relay having contacts closing responsive to the energization of said second relay, circuit means to connect said second thermostat switch to said control conductors responsive to closure of said second-named relay contacts, latching means to hold said second-named relay contacts closed subsequent to energization of said second relay, a source of current, a two-position control switch associated with each relay, each control switch having a normal position and an operated position, the control switches being in physically-spaced locations, circuit means connecting each relay to the source responsive to the actuation of its associated control switch to its operated position, and means releasing the latching means of each relay responsive to the energization of the other relay, whereby the relays may be selectively energized.

8. In a zoned temperature control system, a pair of control conductors adapted to be connected to a device to be thermostatically controlled, a first thermostat switch, a second thermostat switch, a first relay having contacts closing responsive to energization of the relay, latching means to hold said contacts closed subsequent to such energization, means to connect said first thermostat switch to said control conductors responsive to closure of said relay contacts, a second relay having contacts closing responsive to the energization of said second relay, circuit connection means at a plurality of different physical locations in the system, said second thermostat being connectible to any of said circuit connection means, circuit means to connect said second thermostat switch when connected to one of said circuit connection means to said control conductors responsive to closure of said second-named relay contacts, latching means to hold said second-named relay contacts closed subsequent to energization of said second relay, a source of current, a two-position control switch associated with each relay, each control switch having a normal position and an operated position, circuit means connecting each relay to the source responsive to the actuation of its associated control switch to its operated position, and means releasing the latching means of each relay responsive to the energization of the other relay.

References Cited by the Examiner

UNITED STATES PATENTS

| | | | |
|---|---|---|---|
| 2,235,620 | 3/1941 | Nessell | 236—9 X |
| 2,832,901 | 4/1958 | Turner | 317—137 X |
| 2,949,234 | 4/1960 | Nessell | 236—11 X |
| 2,971,135 | 2/1961 | Ebert | 307—38 X |
| 3,024,007 | 3/1962 | Gordon | 165—22 X |
| 3,074,643 | 1/1963 | Nelson | 236—9 X |

STEPHEN W. CAPELLI, *Primary Examiner.*

SAMUEL BERNSTEIN, *Examiner.*

J. A. SILVERMAN, *Assistant Examiner.*